L. E. NORQUIST.
CATAMENIAL APPLIANCE.
APPLICATION FILED AUG. 21, 1917.
1,263,797. Patented Apr. 23, 1918.
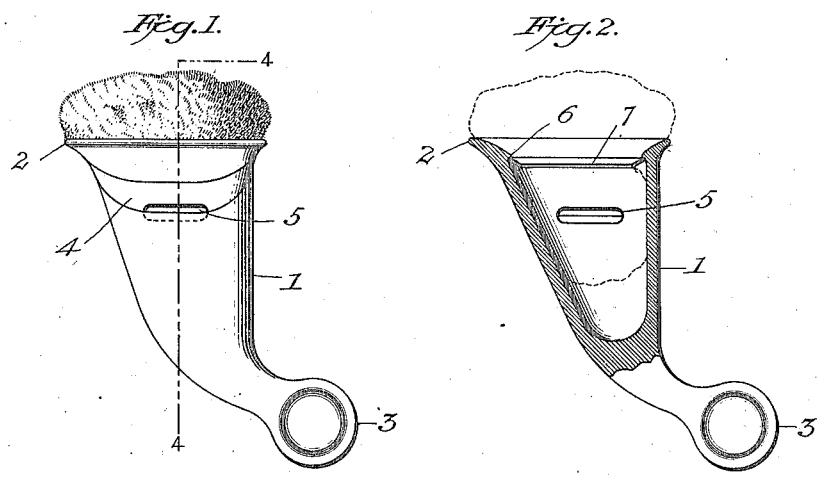
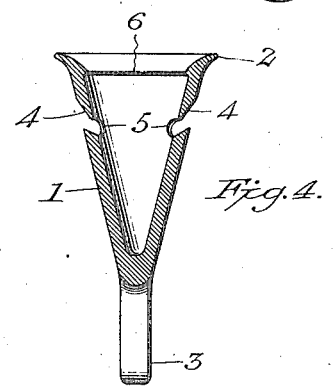
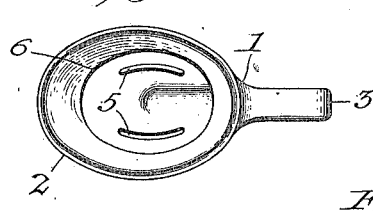
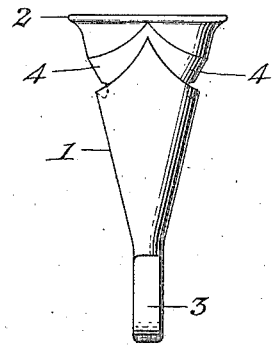
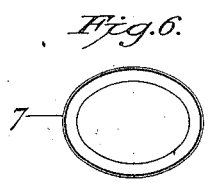
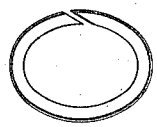
Witnesses:
G. Sargent Elliott
Adella M. Fowle
Inventor:
By Lester E. Norquist
H. S. Bailey. Attorney.

UNITED STATES PATENT OFFICE.

LESTER E. NORQUIST, OF DENVER, COLORADO.

CATAMENIAL APPLIANCE.

1,263,797. Specification of Letters Patent. Patented Apr. 23, 1918.

Application filed August 21, 1917. Serial No. 187,437.

*To all whom it may concern:*

Be it known that I, LESTER E. NORQUIST, a citizen of the United States of America, residing at the city and county of Denver and State of Colorado, have invented a new and useful Catamenial Appliance, of which the following is a specification.

This invention relates to improvements in catamenial appliances, the same being an improvement over a similar device for which an application for a patent was filed by me on July 20, 1917, Serial No. 181,845.

The object of the invention is to provide a thoroughly sanitary appliance of this character, in the form of an elongated cup or vessel, of any suitable material, which is adapted to be inserted in the vagina, the said vessel being adapted to hold a suitable absorbent element such as a sponge, which with the vessel, may be removed, when necessary, for sanitary reasons, the wall of the vessel being formed with apertures through which secretions passing by the rim of the vessel will be conducted into the interior of the vessel and absorbed by the sponge, the said vessel occasioning no inconvenience to the wearer, and requiring no external supporting means, means being provided for engaging and retaining the sponge within the vessel to insure the withdrawal of the same with the vessel.

These objects are accomplished by the device illustrated in the accompanying drawings, in which:

Figure 1, is a side elevation of the improved appliance.

Fig. 2, is a vertical longitudinal sectional view through the cup portion of the same, showing the sponge-retaining spring, the sponge being removed but shown in dotted lines.

Fig. 3, is a plan view of the device.

Fig. 4, is a vertical sectional view on the line 4—4 of Fig. 1.

Fig. 5, is a view looking toward the right hand side of Fig. 1.

Fig. 6 is a plan view of an undivided sponge retaining ring. And

Fig. 7, is a plan view of a divided ring.

Similar letters of reference refer to similar parts throughout the several views.

Referring to the accompanying drawings:—

The numeral 1 indicates the cup or vessel, which may be made of any material suitable for the purpose, such as hard rubber or aluminum. The vessel is preferably elliptical in cross section, though it may be round in cross section if desired, and its upper end terminates in a flared rim 2, from which point the vessel tapers toward its lower end, which terminates in a laterally extending grasping portion 3, which is rounded as shown and concaved on each side, so as to provide a member which may be grasped by the thumb and finger when inserting and removing the vessel. On opposite sides of the vessel, and at a suitable distance below the rim thereof, are formed troughs or channels 4, the bottom walls of which incline downwardly from their outer edges, as clearly shown by Fig. 4, and these channels are upwardly curved from each side of their longitudinal centers, and extend around the wall of the vessel, until they merge at diametrically opposite points. In other words, the lowest portions of the channels are on opposite sides of the vessel represented by its shortest diameter, while the highest points of the channels are at opposite points of the vessel represented by its longest diameter. Diametrically opposite horizontal slots 5 are formed in the wall of the vessel, at the lowest points of the channel, and these slots form communication between the channels and the interior of the vessel. The rim of the vessel is sufficiently flared to engage the wall of the vagina and be held by the natural contraction thereof, the rim terminating in a thin, rounded edge.

Upon the interior wall of the vessel and a short distance below the rim thereof, is formed an introverted flange or lip 6, of slight depth, which is adapted to engage and hold a thin flat ring 7, which may be solid or undivided, as shown in Fig. 6, or divided as shown in Fig. 7.

This ring is preferably dished, as shown in Fig. 2, though its surface may be flat or horizontally disposed if desired, and it is sprung under the flange 6, which holds it against upward movement.

An absorbent element, preferably a sponge, is inserted in the vessel, a portion of the same extending above the rim thereof. The ring 7 is adapted to hold the sponge in position, as that portion of the sponge below the ring will bulge out, and engage the inner edge of the ring, and thus the sponge will thereby be retained within the vessel, when the same is withdrawn.

The sponge absorbs the secretions, and when necessary may be removed and cleansed. The rim of the vessel is adapted to prevent the escape of the secretion, but should any pass below the rim, it will enter the channels 4, and pass into the vessel through the slots 5, when it will be absorbed by the sponge.

In practice, a piece of soft sponge or other suitable absorbent is placed in the vessel so as to fill the same and extend above the rim.

The vessel is preferably wholly inserted, the grasping portion 3 extending forward, and it is removed only for purposes of cleansing.

The device meets all sanitary requirements, and eliminates the discomfort and inconvenience of appliances in common use.

Having described my invention, what I claim as new and desire to secure by Letters Patent, is:

1. A device of the character described, comprising a cup or vessel having a flared rim and adapted to hold an absorbent element, said vessel having openings on opposite sides and channels leading to said openings, and means for retaining the absorbent element within the cup.

2. A device of the character described, comprising a cup or vessel for retaining an absorbent element, having oppositely positioned openings in its wall and channels which extend up in opposite directions from said openings and merge at diametrically opposite points, and removable means for holding the absorbent element within the vessel, said vessel having a flared rim.

3. In a device of the character described, a vessel adapted to hold an absorbent element, and having a flared rim and terminating at its opposite end in a laterally extending grasping portion, a ring in the upper portion of said vessel for retaining said absorbent element and means for holding the same, said vessel having oppositely positioned slots extending through its wall and channels formed in the outer surface of the wall, which extend upward in opposite directions from said slots and merge at diametrically opposite points.

4. In a device of the character described, a vessel adapted to hold an absorbent element and having a flared rim and terminating at its opposite end in a laterally disposed grasping portion, the wall of said vessel having oppositely positioned horizontal slots extending therethrough and exterior channels which curve upward from opposite ends of said slots and merge at diametrically opposite points, an interior flange near the upper end of said vessel, and a dished ring which is sprung under said flange, said ring being adapted to retain said absorbent material within the vessel.

5. In a device of the character described, an absorbent element holding cup or vessel elliptical in cross section and having a flared upper end from which it tapers toward its opposite end, which terminates in a laterally disposed grasping portion, an introverted interior flange in the upper portion of the cup, a flat dished ring which is sprung under said flange and is adapted to retain the absorbent element within the cup, horizontally disposed elongated openings in opposite sides of said cup and exterior channels which curve upward from the opposite ends of said openings, and merge at diametrically opposite points.

6. In a device of the character described, a cup or vessel elliptical in cross section, the lower portion of which terminates in a laterally disposed grasping portion, while the upper portion terminates in a flared rim, said cup being adapted to hold an absorbent element, a removable introverted ring in the upper portion of said cup for retaining the absorbent element therein, exterior channels on opposite sides of said cup which are upwardly curved on each side of their longitudinal centers, their ends meeting at diametrically opposite points on the long diameter of the ellipse, the lower sides of said channels being inclined downwardly from their outer edges, and elongated horizontal oppositely disposed apertures extending through the wall of the cup from the lowest points of said channels.

In testimony whereof I affix my signature in presence of two witnesses.

LESTER E. NORQUIST.

Witnesses:
G. SARGENT ELLIOTT,
ADELLA M. FOWLE.